(12) United States Patent
Hasegawa et al.

(10) Patent No.: US 12,140,700 B2
(45) Date of Patent: Nov. 12, 2024

(54) METEOROLOGICAL LIDAR

(71) Applicant: EKO INSTRUMENTS CO., LTD., Tokyo (JP)

(72) Inventors: Toshikazu Hasegawa, Tokyo (JP); Eiji Takeuchi, Tokyo (JP); Makoto Tsukamoto, Tokyo (JP); Masanori Yabuki, Kyoto (JP)

(73) Assignee: EKO INSTRUMENTS CO., LTD., Tokyo (JP)

( * ) Notice: Subject to any disclaimer, the term of this patent is extended or adjusted under 35 U.S.C. 154(b) by 528 days.

(21) Appl. No.: 17/282,216

(22) PCT Filed: Oct. 7, 2019

(86) PCT No.: PCT/JP2019/039508
§ 371 (c)(1),
(2) Date: Apr. 1, 2021

(87) PCT Pub. No.: WO2020/071562
PCT Pub. Date: Apr. 9, 2020

(65) Prior Publication Data
US 2021/0333363 A1     Oct. 28, 2021

(30) Foreign Application Priority Data

Oct. 5, 2018    (JP) ................ 2018-190371

(51) Int. Cl.
*G01S 7/481*     (2006.01)
*G01N 21/65*     (2006.01)
(Continued)

(52) U.S. Cl.
CPC ............ *G01S 7/4813* (2013.01); *G01N 21/65* (2013.01); *G01S 17/95* (2013.01); *G01W 1/00* (2013.01)

(58) Field of Classification Search
None
See application file for complete search history.

(56) References Cited

U.S. PATENT DOCUMENTS

| | | | | |
|---|---|---|---|---|
| 3,986,023 A | * | 10/1976 | Frungel | ................ G01N 21/538 |
| | | | | 356/338 |
| 2002/0121101 A1 | * | 9/2002 | Jebaraj | .................... F24F 1/022 |
| | | | | 62/428 |
| 2009/0141746 A1 | * | 6/2009 | Fujikawa | ................ H01S 3/025 |
| | | | | 372/21 |

FOREIGN PATENT DOCUMENTS

| | | |
|---|---|---|
| CN | 101189766 | 5/2008 |
| CN | 205507086 U * | 8/2016 |

(Continued)

OTHER PUBLICATIONS

Dinoev T. et al: "Raman Lidar for Meteorological Observations, RALMO—Part 1: Instrument description", Atmospheric Measurement Techniques, vol. 6, No. 5, Jan. 1, 2013 (Jan. 1, 2013), pp. 1329-1346, X2055925408, DOI: 10.5194/amt-6-1329-2013 Retrieved from the Internet: URL:https://amt.copernicus.org/articles/6/1329/2013/amt-6-1329-2013.pdf>.

(Continued)

*Primary Examiner* — Tarifur R Chowdhury
*Assistant Examiner* — Roberto Fabian, Jr.
(74) *Attorney, Agent, or Firm* — Greenblum & Bernstein, P.L.C.

(57) ABSTRACT

A meteorological lidar capable of measuring vertical distributions of temperature, water vapor concentration, aerosol, wind direction/wind speed, ozone concentration, $CO_2$ concentration, etc., stably and continuously day and night is provided. A meteorological lidar that emits a laser beam of a specific wavelength into the air and measures scattered light generated by the laser beam includes an optical system (Continued)

that emits a laser beam into the air, and a dust-proof part that makes an enclosing space of the optical system clean.

8 Claims, 13 Drawing Sheets

(51) Int. Cl.
　　　*G01S 17/95*　　　(2006.01)
　　　*G01W 1/00*　　　(2006.01)

(56) References Cited

FOREIGN PATENT DOCUMENTS

| CN | 108318896 | | 7/2018 |
|---|---|---|---|
| CN | 108318896 A | * | 7/2018 |
| CN | 207730930 | | 8/2018 |
| CN | 207730930 U | * | 8/2018 |
| JP | 51-012175 | | 1/1976 |

OTHER PUBLICATIONS

M. Froidevaux et al., "A new lidar for water vapor and temperature measurements in the Atmospheric Boundary Layer", Asia Flux News letter Issue 28, Mar. 2009, pp. 13-17.
International Search Report issued in International Patent Application No. PCT/JP2019/039508, dated Dec. 3, 2019.

* cited by examiner

METEOROLOGICAL LIDAR

TECHNICAL FIELD

The present invention relates to a meteorological lidar.

BACKGROUND ART

In view of series of extreme weathers such as local torrential rainfall in recent years, it is desirable to increase the accuracy of weather forecast to allow precautions to be taken by early prediction of abnormal weather conditions. For more accurate weather prediction, it is known to be effective to measure various meteorological elements on the ground surface and to observe the atmosphere using radar, and in addition, to observe vertical distributions of temperature, water vapor concentration, wind direction/wind speed in the atmospheric boundary layer and to enter this data into weather forecasting models when making calculations.

Lidars measure the vertical distributions of temperature, water vapor concentration, wind direction/wind speed in the atmosphere. So-called Doppler lidars have been marketed for the measurement of wind direction/wind speed and used for the investigation of wind conditions in the construction of wind farms.

A description is given now of Raman lidars that take measurement of the water vapor concentration distribution in the atmosphere. There are two types of lidars that measure the water vapor concentration distribution: One is Differential Absorption Lidar (DIAL) and the other is Raman lidar.

A DIAL transmits laser light of two closely spaced wavelengths to the atmosphere. One wavelength is absorbed less by water vapor ($\lambda$-off wavelength) and the other wavelength is absorbed more by water vapor ($\lambda$-on wavelength). The light elastically scattered by aerosol or the like in the atmosphere is observed on the ground, and the light attenuation rates of the two wavelengths at respective altitudes are compared to determine the water vapor concentration. This method requires extremely precise control of the two wavelengths, i.e., a wavelength stability of 1 pm or less.

A Raman lidar emits laser light to the atmosphere and detects vibrational Raman-scattered light included in the light scattered by $H_2O$ and $N_2$ molecules on the ground to determine the distribution of water vapor concentration. Since Raman-scattered light is very low in intensity, it is important to detect it accurately.

In research and development of Raman lidars, it is common to use a harmonic of YAG laser, such as 355 nm. When using the wavelength of 355 nm, the wavelengths of Raman-scattered light originating from $H_2O$ and $N_2$ are 387 nm and 405 nm, respectively. It is extremely difficult to detect the Raman-scattered light of these wavelengths accurately during the day because of the mixed sunlight being the source of noise. Accordingly, the measurement of water vapor concentration using this wavelength is normally made only during the night.

The laser wavelength of 355 nm is also commonly used for temperature measurement Raman lidars, but likewise, accurate measurement during the day is not possible because of the sunlight being the source of noise.

A Raman lidar that uses the wavelength of 266 nm, which is the fourth order harmonic of YAG laser in the UVC range (wavelengths of 200 to 280 nm), has been known as a method of eliminating the influence of sunlight during the day to allow accurate measurement both day and night (see Non-Patent Document 1 below). When using laser of this wavelength, the wavelengths of Raman-scattered light originating from $H_2O$ and $N_2$ in the atmosphere are 295 nm and 284 nm, respectively. Sunlight in the wavelength range of 300 nm or less is absorbed by the ozone layer in the atmosphere (altitude of 10 to 50 km) and hardly reaches the ground surface, i.e., hardly becomes the source of noise.

CITATION LIST

Non-Patent Document

Non-Patent Document 1: M. Froidevaux and six others, "A new lidar for water vapor and temperature measurements in the Atmospheric Boundary Layer," Asia Flux News letter Issue 28, 13-17, March 2009

SUMMARY

Technical Problem

Research and development are ongoing on Raman lidars that use the laser wavelength of 266 nm to take advantage of the wavelengths of the UVC range mentioned above. Nevertheless the mainstream of the research and development focuses on the use of 355 nm and there is no precedent for a successful case of stable and continuous measurement with a 266 nm Raman lidar. This is because of the general incapability of the lidar that uses 266 nm to make stable and continuous measurement. One reason for this is that optical devices such as a nonlinear crystal unit and laser mirror that generate the fourth order harmonic are readily damaged by laser.

The optical devices such as a fourth order harmonic crystal unit and laser mirror in the 266 nm lidar system being developed by the present applicants suffered damage several times in the course of less than a year, necessitating us every time to stop the lidar, replace components, and make adjustments.

Accordingly, it is an object of the present invention to provide a meteorological lidar capable of measuring vertical distributions of temperature, water vapor concentration, aerosol, wind direction/wind speed, ozone concentration, $CO_2$ concentration, etc., stably and continuously day and night.

Solution to Problem

The meteorological lidar according to one aspect of the present invention emits a laser beam of a specific wavelength into the air and measures scattered light generated by the laser beam, and includes an optical system that emits a laser beam into the air, and a dust-proof part that makes an enclosing space of the optical system clean.

This aspect provides a configuration that maintains the optical system in a clean atmosphere to prevent damage to the optical devices, which enables stable and continuous measurement with the meteorological lidar. One possible means of providing a clean enclosing space is to keep the maximum number of dust particles per unit volume of the enclosing space within a predetermined range.

The meteorological lidar according to another aspect of the present invention emits a laser beam of a specific wavelength into the air and measures scattered light generated by the laser beam, and includes an optical system that emits a laser beam into the air, and a temperature-stabilizing part configured to keep a temperature and a temperature variation rate of an enclosing space of the optical system within a predetermined range.

This aspect prevents sudden temperature fluctuations of the optical system, which prevents damage to the optical devices and enables more stable and continuous measurement with the meteorological lidar.

The meteorological lidar according to one aspect of the present invention may include both of the dust-proof part and the temperature-stabilizing part.

In the aspect described above, the specific wavelength may be 200 to 280 nm. This aspect realizes stable operation of the meteorological lidar using the laser of a wavelength in the UVC range, even though it is particularly hard to achieve, since, the shorter the wavelength, the smaller the laser-induced damage threshold (laser beam density at which damage starts) of optical devices, and generally the more severely the optical devices suffer damage.

In the aspect described above, the optical system and the temperature-stabilizing part may be configured to be thermally separated from each other. This aspect separates the constituent elements that can be the source of heat such as the temperature-stabilizing part from the optical system, to ensure reliable temperature control of the optical system.

Advantageous Effects of Invention

The present invention can provide a meteorological lidar capable of measuring vertical distributions of temperature, water vapor concentration, etc., stably and continuously day and night.

DESCRIPTION OF EMBODIMENTS

Figure 1:
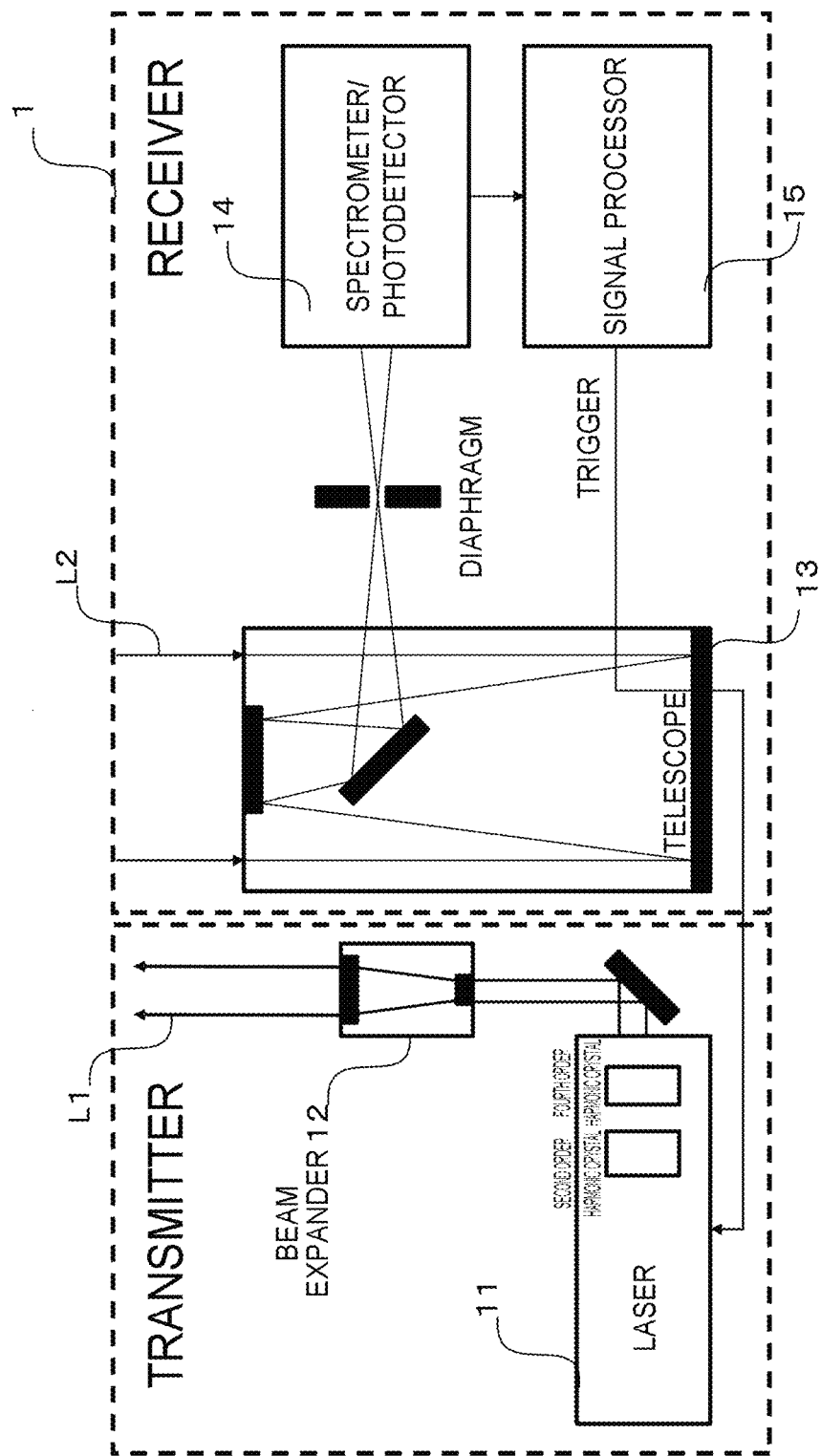
FIG. 1 is a diagram illustrating a configuration of a meteorological lidar in one embodiment of the present invention.

A preferred embodiment of the present invention (hereinafter "present embodiment") will be hereinafter described with reference to the accompanying drawings (elements given the same reference numerals in each drawing have the same or similar configuration).

The shorter the wavelength, the smaller the laser-induced damage threshold (laser beam density at which damage starts) of optical devices, and therefore it is considered that the optical devices will suffer damage generally more severely in lidars that use the wavelength of 266 nm as compared to lidars that use the wavelength of 355 nm. So far, this technical common sense has not been questioned.

However, in view of the fact that laser light emitted by a meteorological lidar has an energy density of 0.5 mJ/cm$^2$ or less, the present inventors assumed that this level of energy density could not cause a substantial issue in optical devices that would lead to damage, and suspected other causes. The result the present inventors reached is that one of the causes of laser-induced damage was surface contamination of the optical devices. This led the present inventors to consider that lidars, in particular outdoor lidars, need sufficient measure to prevent contamination of optical devices.

When optical devices such as a harmonic crystal, wavelength separator, beam expander, mirror, emission window and so on that configure the meteorological lidar are irradiated with laser light with dust adhered on the surfaces of these optical devices, the dust may change properties and burn on the surfaces of the optical devices due to overheating or photodecomposition. This sometimes causes an anti-reflective coating or high reflective coating on the surfaces of optical devices to suffer damage such as chipping, thickness loss or thickness buildup.

For example, the harmonic crystal is provided with an anti-reflective coating on the surface to allow emission of a laser beam wavelength of 266 nm from inside of the crystal to the outside with a high transmission rate. A damaged anti-reflective coating would inhibit high-transmission emission of the laser beam wavelength of 266 nm from the harmonic crystal, letting the laser beam be reflected by the crystal surface and travel back into the crystal. This, further repeated a number of times, eventually damages the crystal itself.

When the high reflective coating on the surface of a mirror is damaged, the reflectivity of the 266 nm laser beam on the mirror surface is lowered, which causes the base material of the mirror to be irradiated with the high-energy laser light and the mirror to be damaged. Moreover, dust floating on and around the optical path of the 266 nm laser beam irradiated with the laser light may change properties or transform into particulates by photodecomposition or the like, and may adhere on the surfaces of the optical devices. This can lead to damage to the optical devices as described above. The 1064 nm fundamental laser beam and the 532 nm second order harmonic laser beam can damage optical devices by the similar mechanism.

The meteorological lidar of the present embodiment is configured such as to prevent contamination of the laser main body and laser light emission components, in particular. More specifically, the main body of the laser and peripheral optical systems are encased in a clean booth and kept in a clean atmosphere.

Another measure that can be taken for stable operation of the 266 nm laser was considered to be stabilization of ambient temperature of optical components including the laser and prevention of sudden temperature fluctuations. A change in the ambient temperature of the laser may cause the laser oscillation to switch from single mode to multi mode. It is known that multi mode laser light reduces the laser-induced damage threshold of optical devices to about one fourth of that of the single mode, i.e., optical devices can be damaged more easily.

As a result of taking measures to prevent contamination and temperature fluctuations as described above, we realized a meteorological lidar, which was capable of stable and continuous measurement without suffering damage to optical devices for 10 months from the end of November, 2017 until the time of filing. Specific configurations of the meteorological lidar in the present embodiment will be illustrated below.

FIG. 1 illustrates a basic configuration of the meteorological lidar 1 in the present embodiment. The meteorological lidar 1 of the present embodiment transmits a 266 nm laser beam L1 from a laser 11 via a beam expander 12 to the atmosphere and detects light L2 scattered in the atmosphere with a telescope 13. The received scattered light is split into individual wavelengths by a spectrometer 14, and intensities of Raman-scattered light of $H_2O$, $N_2$, and $O_2$ molecules are measured in a signal processor 15.

Figure 2:
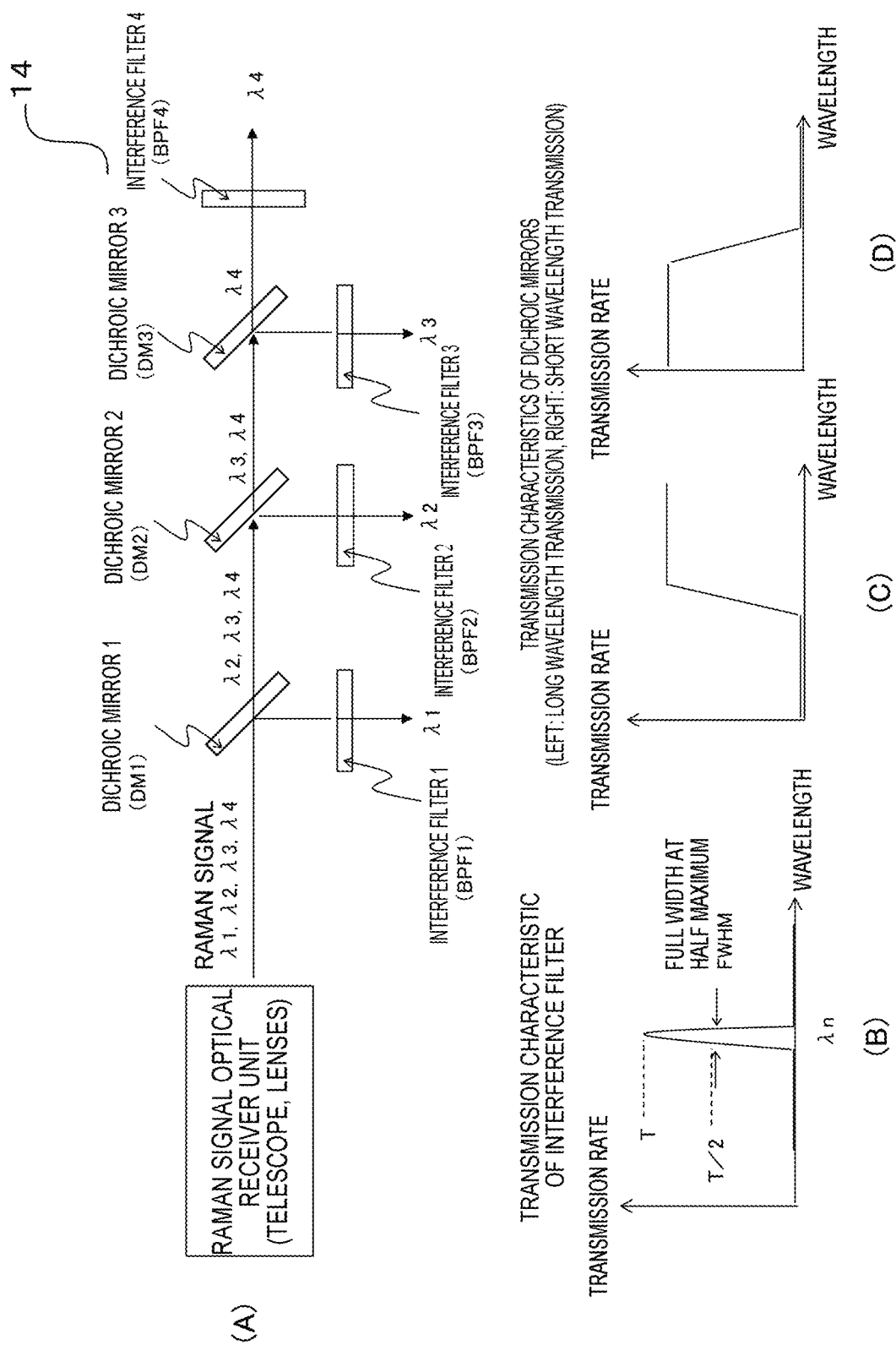
FIG. 2 is a diagram illustrating a configuration of a spectrometer of the meteorological lidar in the embodiment of the present invention.

FIG. 2 is one example of the configuration of the spectrometer 14 of the meteorological lidar in the present embodiment. In this example, Raman-scattered light is isolated and extracted using dichroic mirrors and interference filters. In spectroscopy using a diffraction grating such as, typically, a polychromator, stray light causes unwanted spectra to be mixed with the target wavelength as noise. Since Raman-scattered light is very weak, it is extremely susceptible to the influence of noise.

Spectroscopy using interference filters, on the other hand, allows for easy separation of wavelengths to be transmitted from wavelengths to be blocked. Measurement of the UVC range, in particular, does not require narrow transmission band interference filters since it is hardly affected by the sunlight, and with the use of broad transmission band interference filters that are easily producible and have a high transmission rate, the influence of stray light can be avoided and the lidar performance can be improved.

Figure 3:
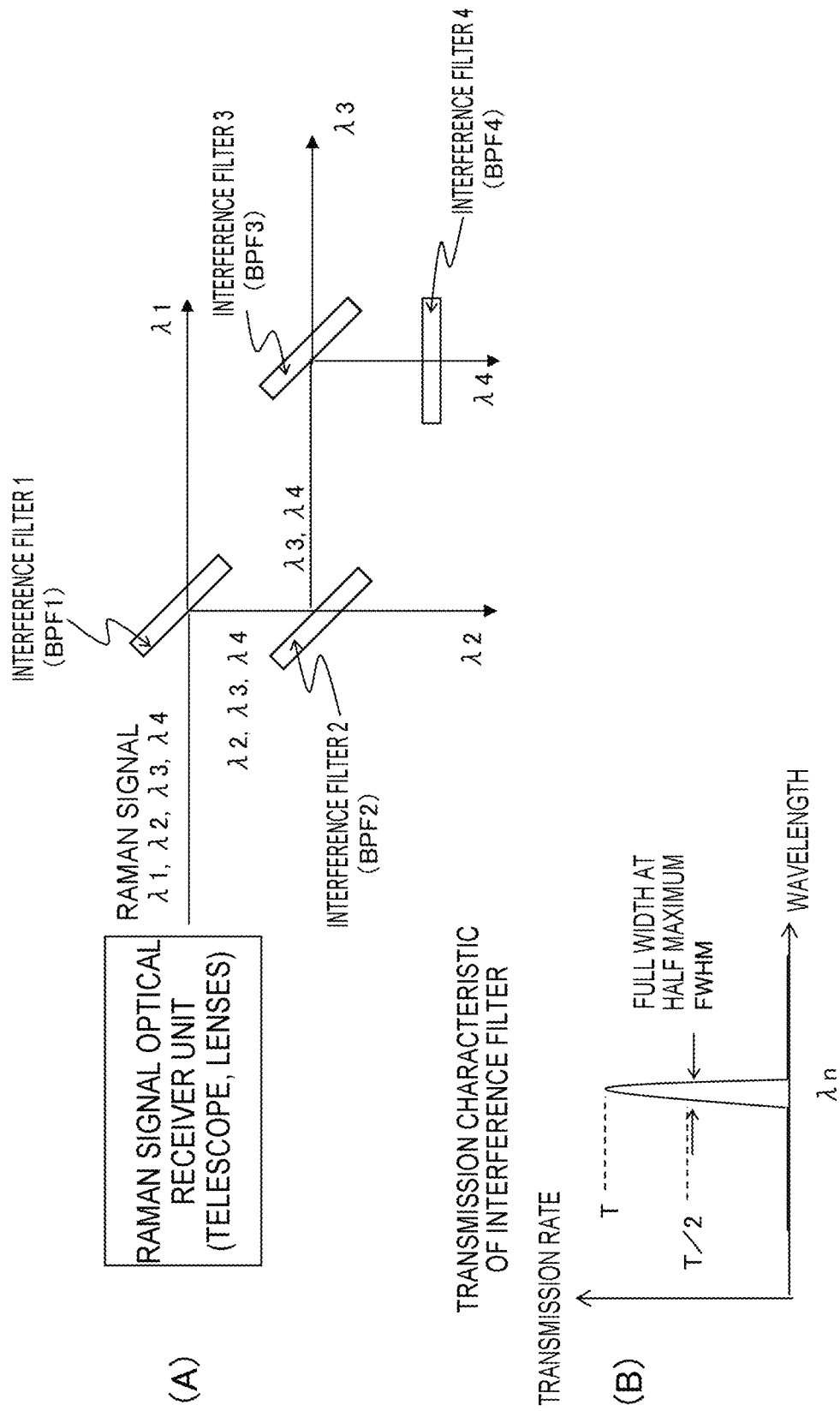
FIG. 3 is a diagram illustrating another form of configuration of the spectrometer of the meteorological lidar in the embodiment of the present invention.

FIG. 3 is another configuration example of the spectrometer 14 of the meteorological lidar in the present embodiment. In this example, Raman-scattered light is isolated and extracted with only interference filters, without using dichroic mirrors. In this example, the order of the interference filters can be changed around, as long as they are configured such as to be able to isolate a wavelength.

In spectroscopy using a diffraction grating such as, typically, a polychromator, stray light causes unwanted spectra to be mixed with the target wavelength as noise. Since Raman-scattered light is very weak, it is extremely susceptible to the influence of noise.

Spectroscopy using interference filters, on the other hand, allows for easy separation of wavelengths to be transmitted from wavelengths to be blocked. Measurement of the UVC range, in particular, does not require narrow transmission band interference filters since it is hardly affected by the sunlight, and with the use of broad transmission band interference filters that are easily producible and have a high transmission rate, the influence of stray light can be avoided and the lidar performance can be improved.

Figure 4:
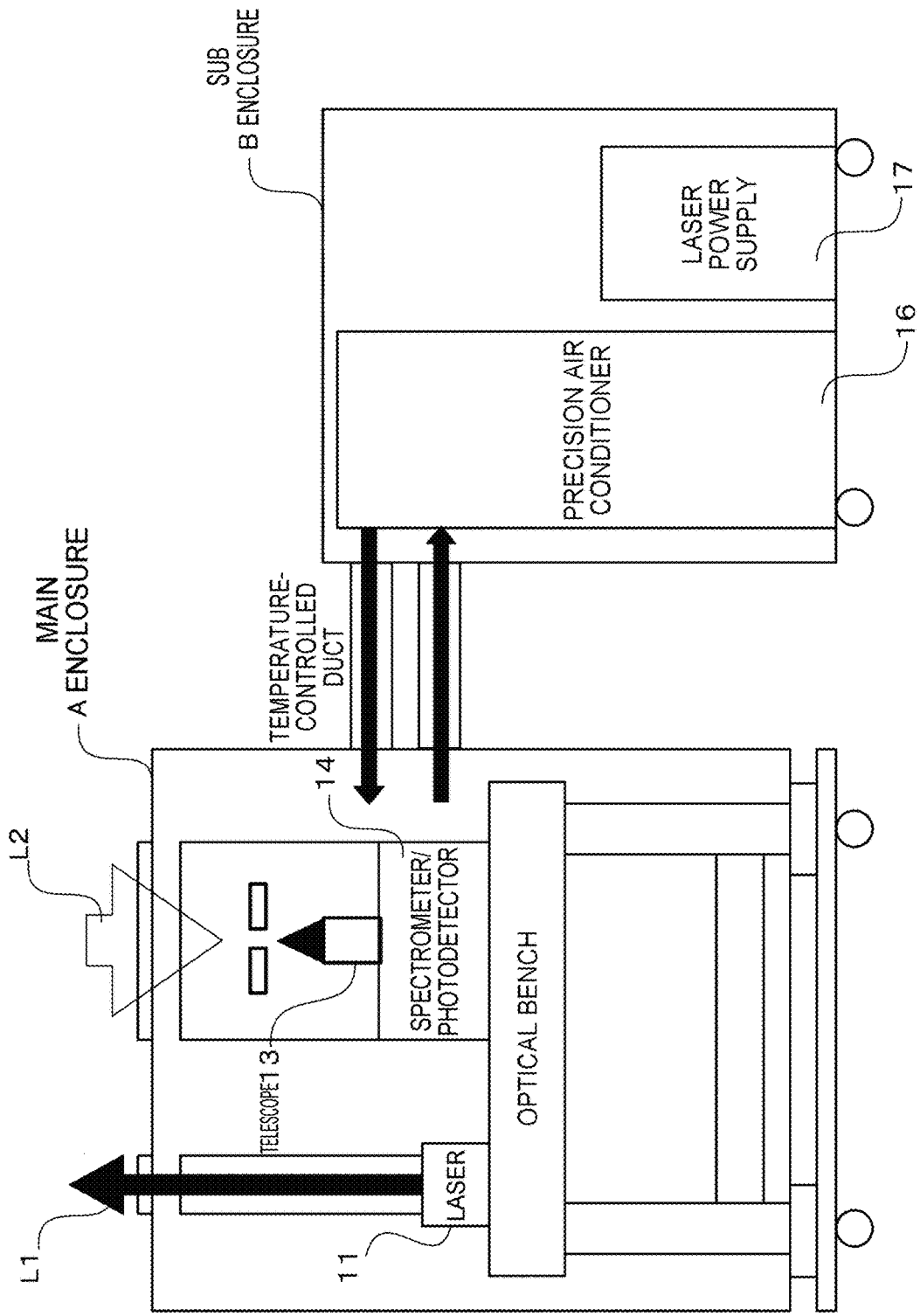
FIG. 4 is a diagram illustrating a configuration layout of various equipment configuring the meteorological lidar in the embodiment of the present invention.

FIG. 4 is a diagram illustrating a configuration layout of various equipment configuring the meteorological lidar 1. This example is made up of two enclosures, one (main enclosure) A accommodating the main body of the laser 11, telescope 13, and optical devices such as mirrors, and the other (sub enclosure) B accommodating a precision air conditioner and others. The main enclosure A that requires precision air conditioning is air-conditioned by a precision air conditioner 16 installed in the sub enclosure B.

Figure 5:
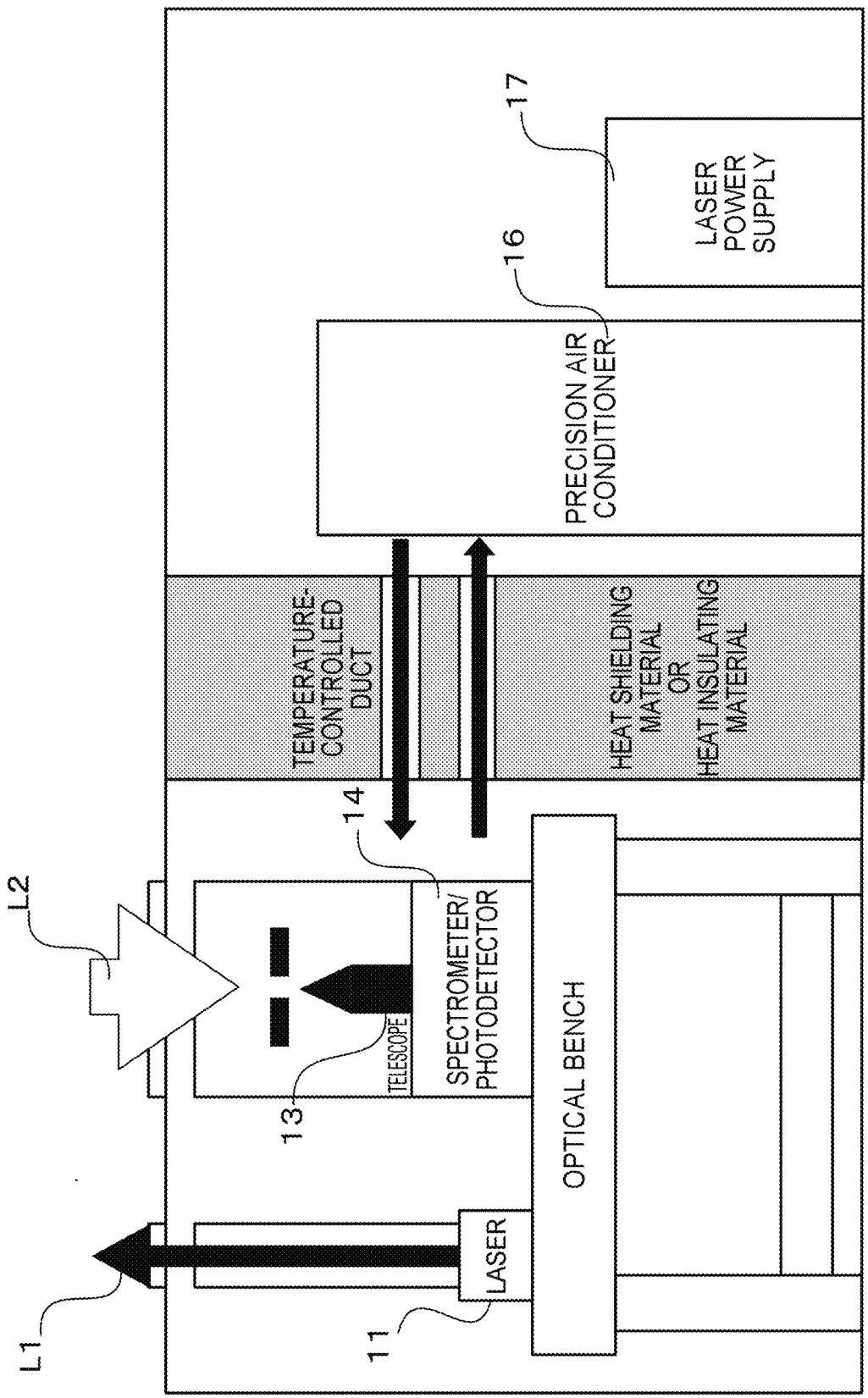
FIG. 5 is a diagram illustrating another form of configuration layout of various equipment configuring the meteorological lidar in the embodiment of the present invention.

FIG. 5 is a diagram illustrating another configuration layout example of various equipment configuring the meteorological lidar 1. In this example, the components constituting the lidar are accommodated in the same enclosure. While the optical system such as the laser, precision air conditioner 16, laser power supply 17 and others are disposed in the same enclosure, their encasing parts are thermally separated from each other for temperature adjustments of laser and the like.

Figure 6:
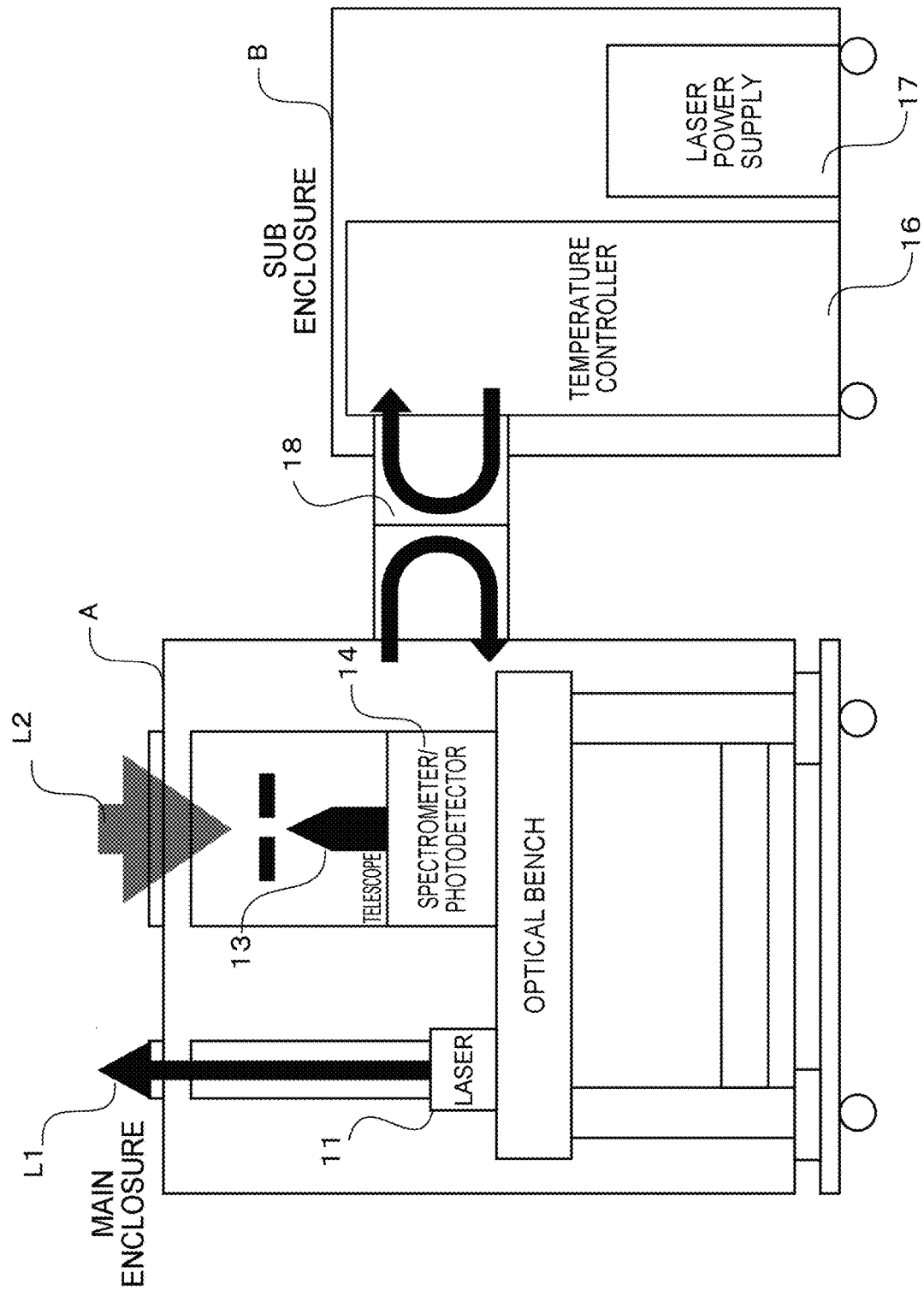
FIG. 6 is a diagram illustrating another form of configuration layout of various equipment configuring the meteorological lidar in the embodiment of the present invention.

FIG. 6 is a diagram illustrating another configuration layout example of various equipment configuring the meteorological lidar 1. This example uses a heat exchanger 18 in addition to the precision air conditioner 16. The heat exchanger 18 is used to perform precision temperature control.

Figure 7:
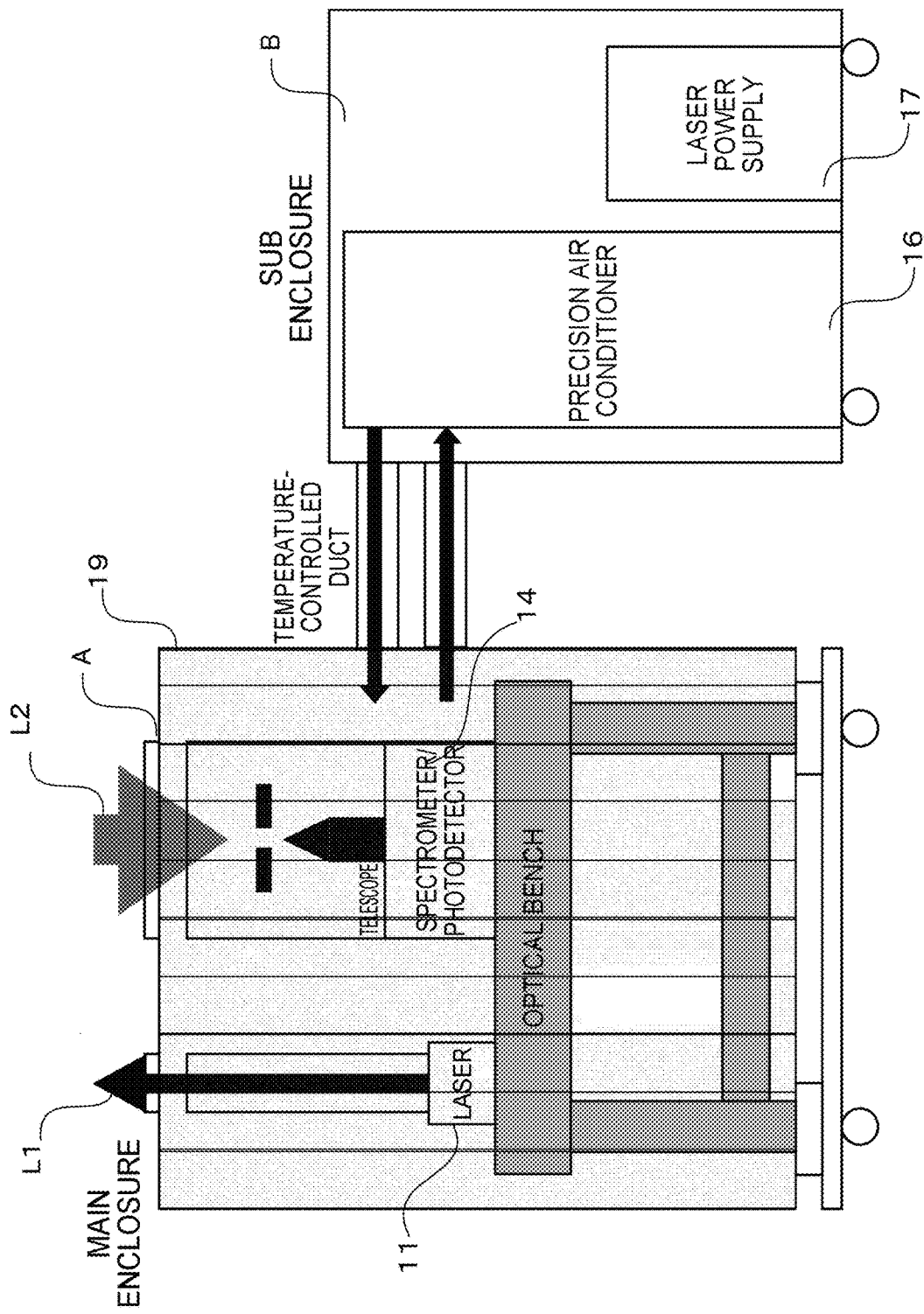
FIG. 7 is a diagram illustrating another form of configuration layout of various equipment configuring the meteorological lidar in the embodiment of the present invention.

FIG. 7 is a diagram illustrating another configuration layout example of various equipment configuring the meteorological lidar 1. A slit curtain 19 is provided inside the main enclosure in the example illustrated in FIG. 4 to prevent dust from outside from reaching the laser and peripheral optical devices.

Figure 8:
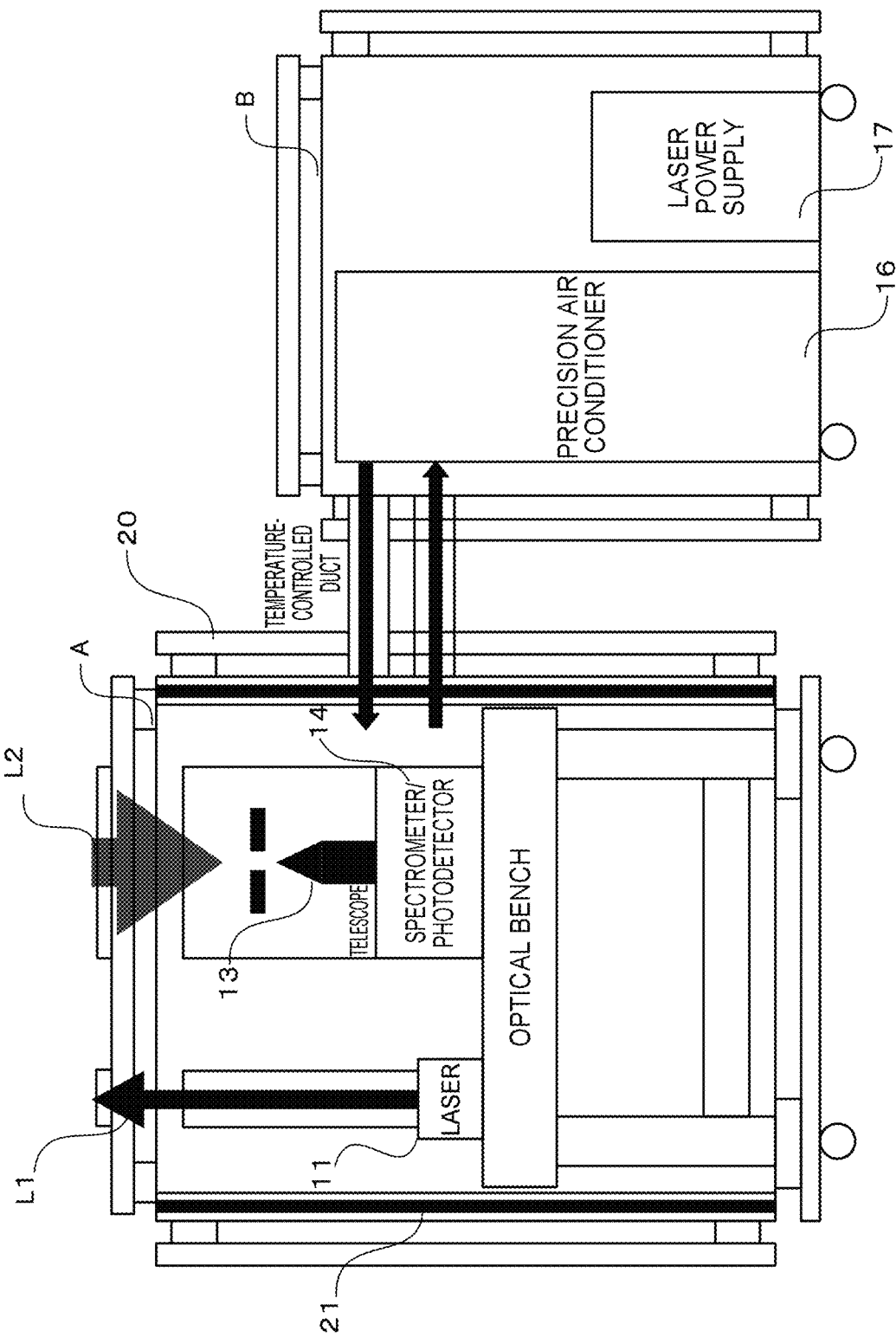
FIG. 8 is a diagram illustrating another form of configuration layout of various equipment configuring the meteorological lidar in the embodiment of the present invention.

FIG. 8 is a diagram illustrating another configuration layout example of various equipment configuring the meteorological lidar 1, which includes an improvement in the configuration of the enclosures. In this example, to mitigate the temperature rise inside the enclosures caused by sunlight, the walls of the enclosures are made up of sunshade side plates 20 and sandwich panels 21 that use an insulating material as the core.

Figure 9:
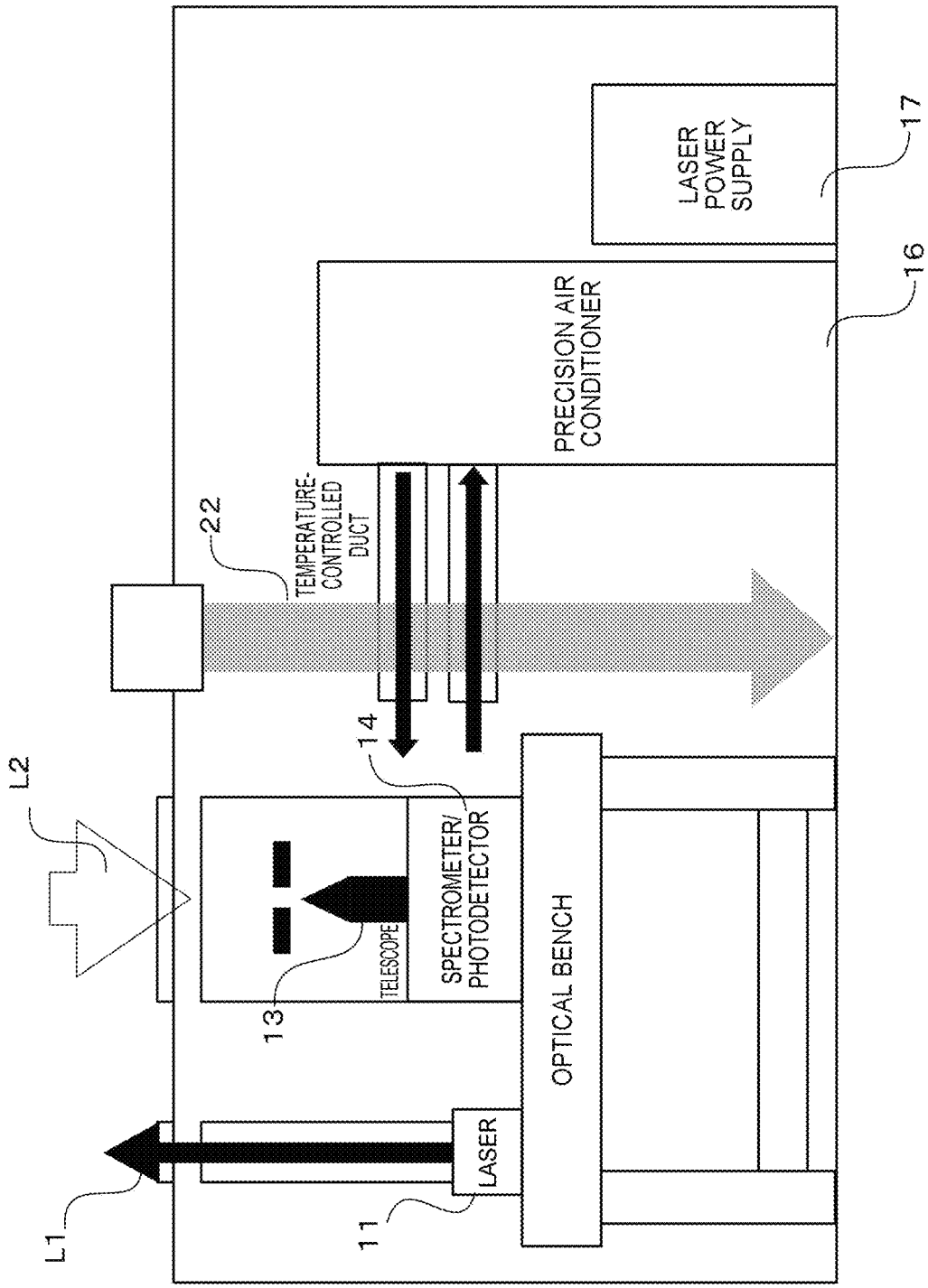
FIG. 9 is a diagram illustrating another form of configuration layout of various equipment configuring the meteorological lidar in the embodiment of the present invention.

FIG. 9 is a diagram illustrating another configuration layout example of various equipment configuring the meteorological lidar 1, which uses an air curtain 22 to thermally separate the optical system from other configurations such as the precision air conditioner and laser power supply 17.

Figure 10:
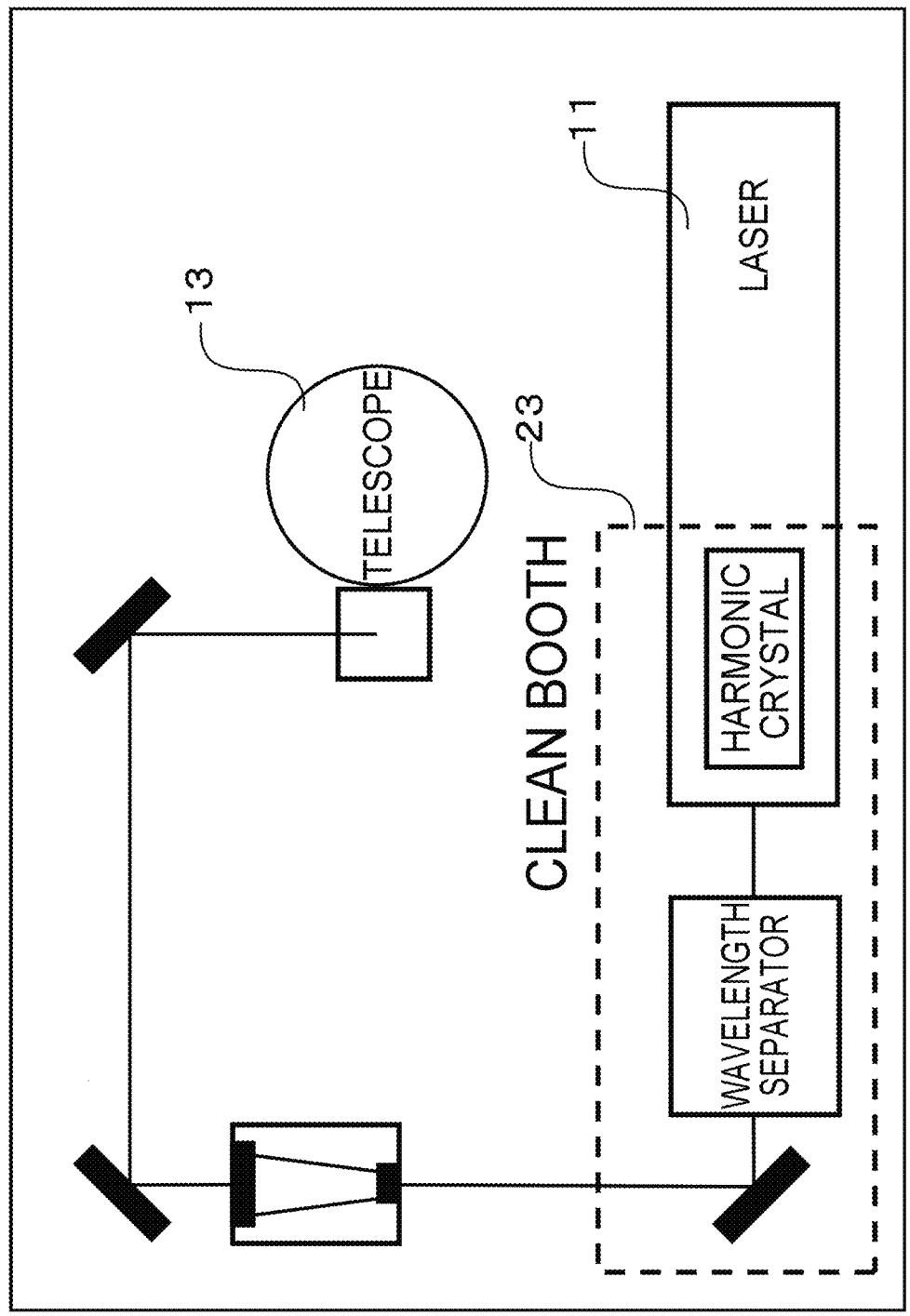
FIG. 10 is a diagram illustrating a configuration of an optical system of the meteorological lidar in the embodiment of the present invention.

FIG. 10 is a diagram illustrating a configuration of an optical system of the meteorological lidar 1. In this example, the main body of the laser and peripheral optical devices are encased in a clean booth 23 to secure a clean atmosphere.

Figure 11:
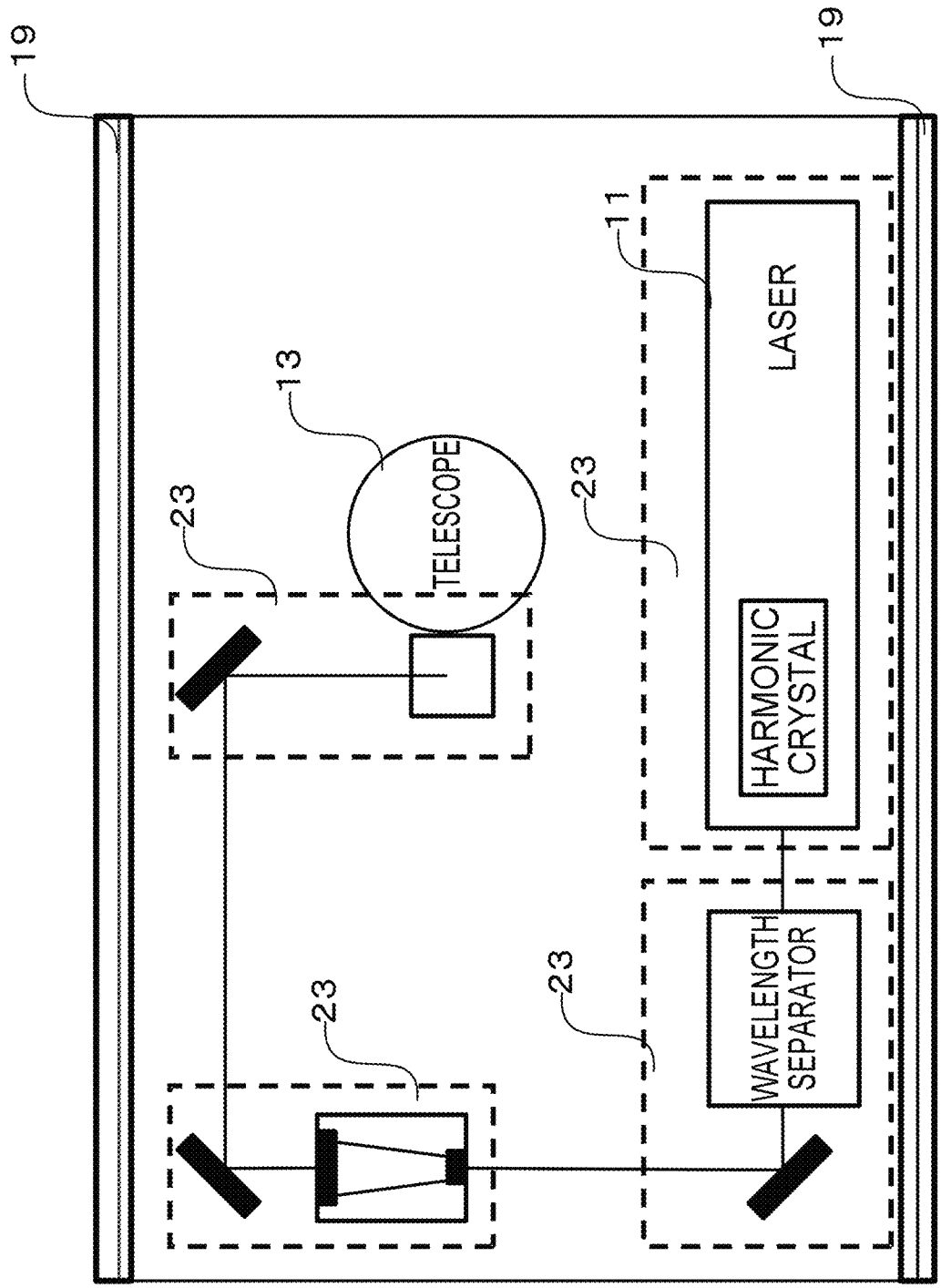
FIG. 11 is a diagram illustrating another configuration of the optical system of the meteorological lidar in the embodiment of the present invention.

FIG. 11 is a diagram illustrating another configuration of the optical system of the meteorological lidar 1, in which a plurality of clean booths 23 are installed.

Figure 12:
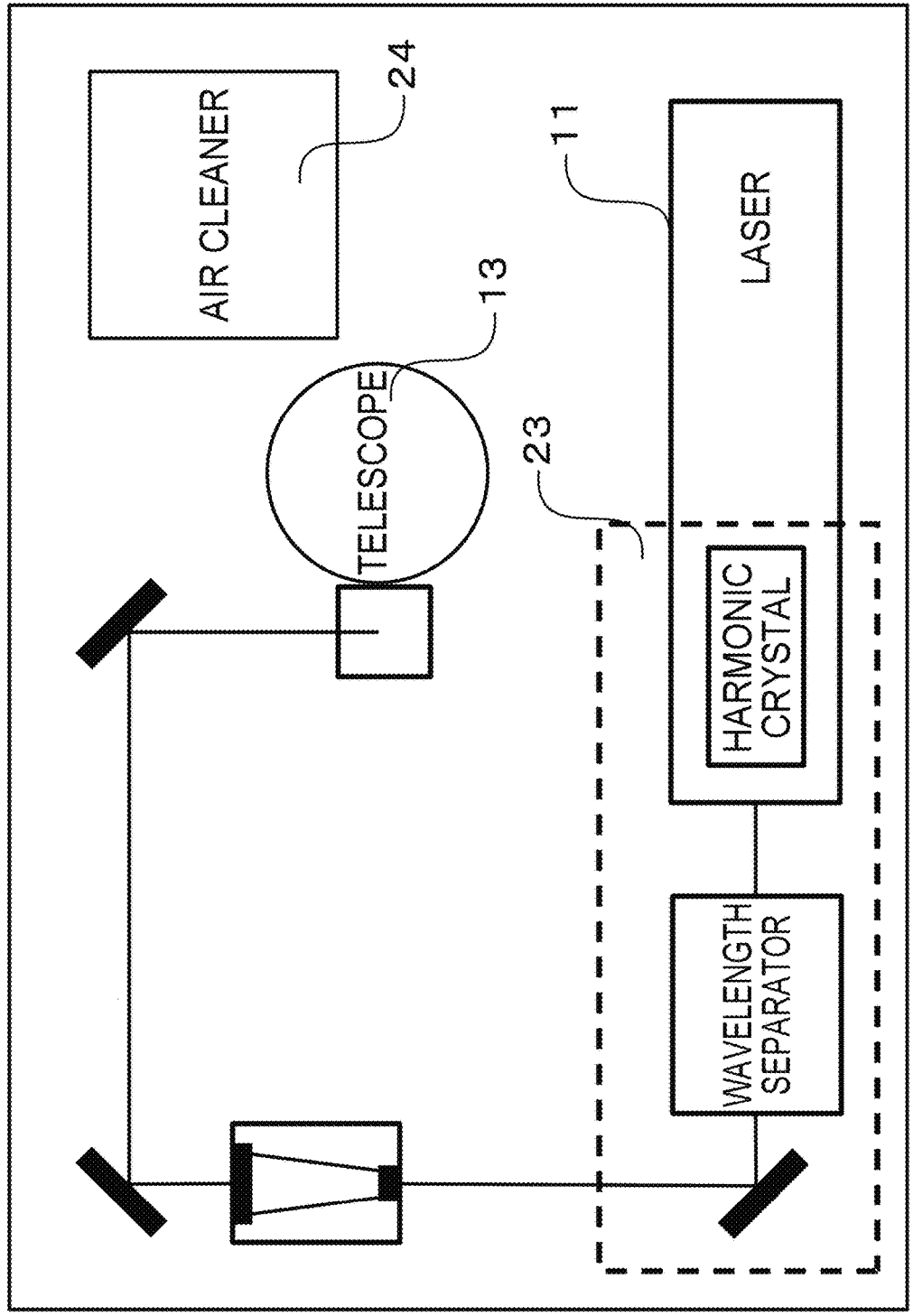
FIG. 12 is a diagram illustrating another configuration of the optical system of the meteorological lidar in the embodiment of the present invention.

FIG. 12 is a diagram illustrating another configuration of the optical system of the meteorological lidar 1, in which an air cleaner 24 is used to secure a clean atmosphere.

Figure 13:
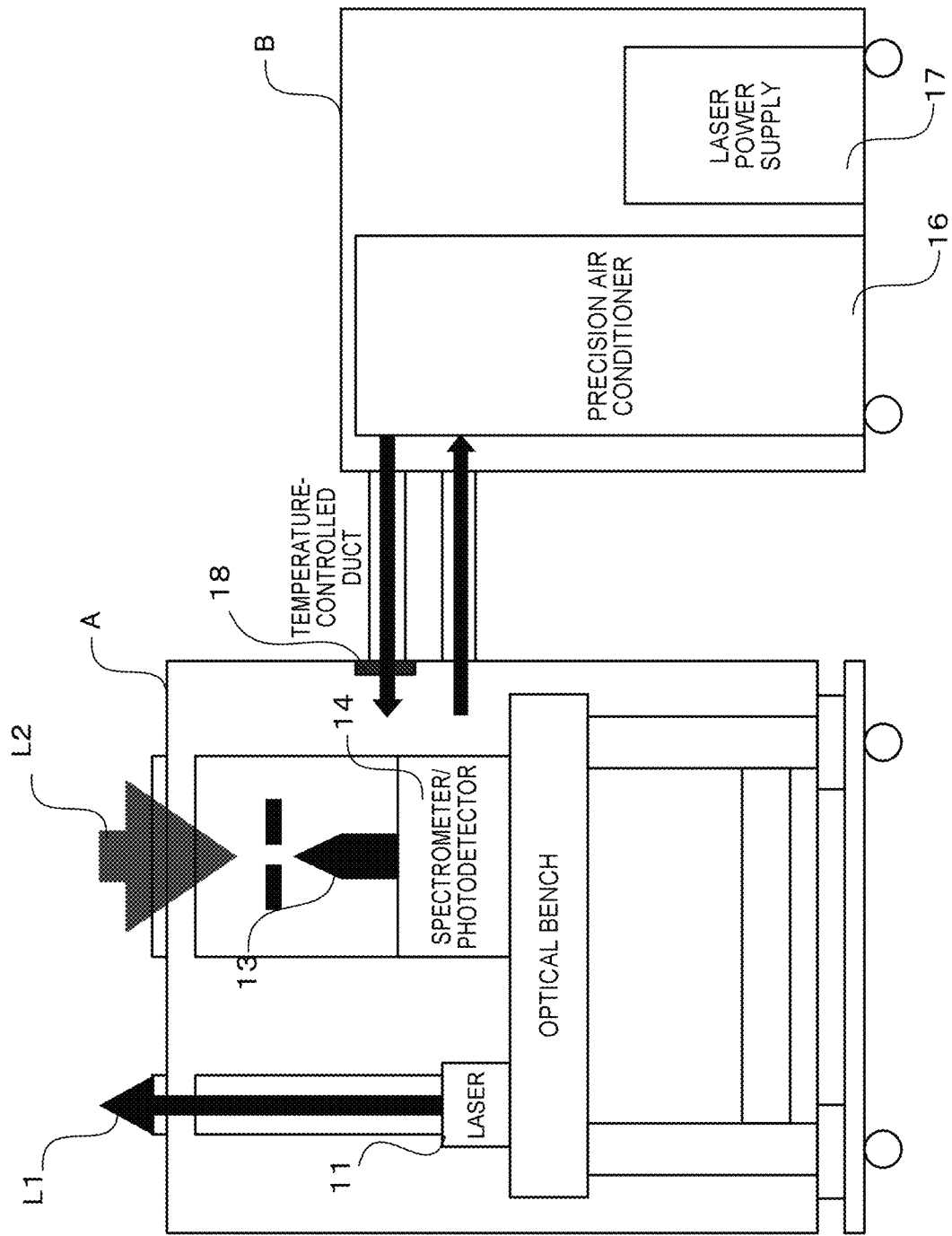
FIG. 13 is a diagram illustrating another form of configuration layout of various equipment configuring the meteorological lidar in the embodiment of the present invention.

FIG. 13 is a diagram illustrating another form of configuration layout of various equipment configuring the meteorological lidar 1, in which an air filter 25 is installed to clean the temperature-controlled air from the sub enclosure B to the main enclosure A. In this example, the air inside the main enclosure A can be cleaned by circulation of the temperature-controlled air.

The present embodiment described above provides a configuration that maintains the optical system in a clean atmosphere to prevent damage to the optical devices, which enables stable and continuous measurement with the meteorological lidar. Damage to the optical devices can be avoided also by preventing sudden temperature fluctuations of the optical system, which enables more stable and continuous measurement with the meteorological lidar. The shorter the wavelength, the smaller the laser-induced damage threshold (laser beam density at which damage starts) of optical devices, and generally the more severely the optical devices suffer damage. In this aspect, stable operation of a meteorological lidar using the laser of a wavelength in the UVC range, which is particularly hard to achieve, is realized.

While the wavelength is 266 nm in the description above, more or less the same effects would be achieved with the use of laser of a longer wavelength. Examples of longer wavelengths include 355 nm, and 532 nm, the third order harmonic and second order harmonic of YAG laser, respectively, and 248 nm, 308 nm, and 351 nm of excimer laser.

The embodiment described above is given for facilitating the understanding of the present invention and not for limiting the interpretation of the present invention. Various elements in the embodiment, their arrangements, materials, conditions, shapes, sizes and so on are not limited to the illustrated examples and may be changed as required. Also, various features illustrated in different forms of embodiment can be partially interchanged or combined.

REFERENCE SIGNS LIST

1 Meteorological lidar
11 Laser
12 Beam expander
13 Telescope
14 Spectrometer
15 Signal processor
16 Precision air conditioner
17 Laser power supply
18 Heat exchanger
19 Slit curtain
20 Side plate
21 Sandwich panel
22 Air curtain
23 Clean booth
24 Air cleaner
25 Air filter
A Main enclosure
B Sub enclosure
L1 Laser beam
L2 Light

What is claimed is:

1. A meteorological lidar that emits a laser beam of a specific wavelength into the air and measures scattered light generated by the laser beam, the meteorological lidar comprising:
a laser that emits the laser beam into the air;
a telescope that detects the scattered light generated by the laser beam;
a spectrometer that measures the scattered light detected by the telescope;
a main enclosure that encloses the laser, the telescope, and the spectrometer to make an enclosing space of the laser, the telescope, and the spectrometer clean;
at least one of an air cleaner or an air filter that removes dust floating on and around an optical path of the laser beam to keep the main enclosure as a clean atmosphere;
an air conditioner that is outside the main enclosure for adjusting a temperature of the enclosing space of the main enclosure, which encloses the laser, the telescope, and the spectrometer;
a sub-enclosure that encloses the air conditioner to make a sub-enclosing space of the air conditioner; and
a heat exchanger between the enclosing space of the main enclosure and the sub-enclosing space of the sub-enclosure, with the enclosing space of the main enclosure being isolated and separate from the sub-enclosing space of the sub-enclosure.

2. A meteorological lidar that emits a laser beam of a specific wavelength into the air and measures scattered light generated by the laser beam, the meteorological lidar comprising:
a laser that emits the laser beam into the air;
a telescope that detects the scattered light generated by the laser beam;
a spectrometer that measures the scattered light detected by the telescope; and
an air conditioner that is configured to be outside of a main enclosure for adjusting a temperature and a temperature variation rate of an enclosing space of the laser, the telescope, and the spectrometer within a predetermined range,
wherein the air conditioner is connected to the main enclosure by a duct, and
the duct both provides air to and receives air from the main enclosure to adjust the temperature and the temperature variation rate of the enclosing space of the laser, the telescope, and the spectrometer within the predetermined range.

3. A meteorological lidar that emits a laser beam of a specific wavelength into the air and measures scattered light generated by the laser beam, the meteorological lidar comprising:
a laser that emits the laser beam into the air;
a telescope that detects the scattered light generated by the laser beam;
a spectrometer that measures the scattered light detected by the telescope;
a main enclosure that encloses the laser, the telescope, and the spectrometer to make an enclosing space of the laser, the telescope, and the spectrometer clean;
an air conditioner that is configured to be outside of the main enclosure for adjusting a temperature and a temperature variation rate of the enclosing space of the laser, the telescope, and the spectrometer within a predetermined range; and
at least one of an air cleaner or an air filter that removes dust floating on and around an optical path of the laser beam to keep the main enclosure as a clean atmosphere,
wherein the air conditioner is connected to the main enclosure by a duct, and
the duct both provides air to and receives air from the main enclosure to adjust the temperature and the temperature variation rate of the enclosing space of the laser, the telescope, and the spectrometer within the predetermined range.

4. The meteorological lidar according to claim 1, wherein the specific wavelength is 200 nm to 280 nm.

5. The meteorological lidar according claim 2, wherein the specific wavelength is 200 nm to 280 nm.

6. The meteorological lidar according claim 3, wherein the specific wavelength is 200 nm to 280 nm.

7. The meteorological lidar according to claim 1, wherein a curtain is provided inside the enclosing space of the main enclosure to prevent the dust from reaching the laser, the telescope, and the spectrometer.

8. The meteorological lidar according claim 3, wherein a curtain is provided inside the enclosing space of the main enclosure to prevent the dust from reaching the laser, the telescope, and the spectrometer.

* * * * *